(12) United States Patent
Brett et al.

(10) Patent No.: US 9,890,901 B2
(45) Date of Patent: Feb. 13, 2018

(54) REPLACEABLE FLUID CONTAINER

(71) Applicant: CASTROL LIMITED, Pangbourne, Reading (GB)

(72) Inventors: Peter Stuart Brett, Berkshire (GB); Steven Paul Goodier, Oxfordshire (GB); Piers Sebastian Harding, Cambridgeshire (GB); Gary Keith Jepps, Cambridgeshire (GB); Thomas James McPherson, Cambridgeshire (GB)

(73) Assignee: Castrol Limited, Reading (GB)

( * ) Notice: Subject to any disclaimer, the term of this patent is extended or adjusted under 35 U.S.C. 154(b) by 183 days.

(21) Appl. No.: 14/443,625

(22) PCT Filed: Nov. 19, 2013

(86) PCT No.: PCT/EP2013/074206
§ 371 (c)(1),
(2) Date: May 18, 2015

(87) PCT Pub. No.: WO2014/076317
PCT Pub. Date: May 22, 2014

(65) Prior Publication Data
US 2015/0292674 A1    Oct. 15, 2015

(30) Foreign Application Priority Data

Nov. 19, 2012 (EP) ...................................... 12193246
Feb. 28, 2013 (EP) ...................................... 13157229

(51) Int. Cl.
*B65D 51/16* (2006.01)
*F16N 19/00* (2006.01)
(Continued)

(52) U.S. Cl.
CPC ............. *F16N 19/00* (2013.01); *F01M 11/04* (2013.01); *F01M 2011/0483* (2013.01)

(58) Field of Classification Search
CPC .. F16N 19/00; F01M 11/04; F01M 2011/0483
(Continued)

(56) References Cited

U.S. PATENT DOCUMENTS

| 3,399,776 A | 9/1968 | Knuth |
| 4,075,099 A | 2/1978 | Pelton et al. |

(Continued)

FOREIGN PATENT DOCUMENTS

| DE | 10136971 | 2/2003 |
| DE | 102012024365 | 6/2014 |

(Continued)

*Primary Examiner* — J. Gregory Pickett
*Assistant Examiner* — Niki M Eloshway
(74) *Attorney, Agent, or Firm* — McDonnell Boehnen Hulbert & Berghoff LLP

(57) ABSTRACT

A replaceable fluid container for a vehicle, for example a vehicle engine, the container comprising: a housing comprising a fluid reservoir; at least one fluid port arranged on the housing to couple the reservoir in fluidic communication with a fluid system of the vehicle; a vent port arranged on the housing to couple the reservoir in fluidic communication with the vehicle for allowing gas to be passed into and out from the reservoir; a vent tube connected at a first end, to said vent port and arranged within the reservoir to pass through fluid contained in the reservoir when the container is connected with the fluid reservoir in fluidic communication with the fluid system of the vehicle, with a second end of the vent tube in a headspace above the fluid in the reservoir, to allow gas communication between the vent port and the headspace, in which the vent tube comprises a vent valve at the second end of the vent tube adapted to close to prevent ingress of fluid and gas from the reservoir into the vent tube when the vent port is not in fluidic communication
(Continued)

Figure 1:
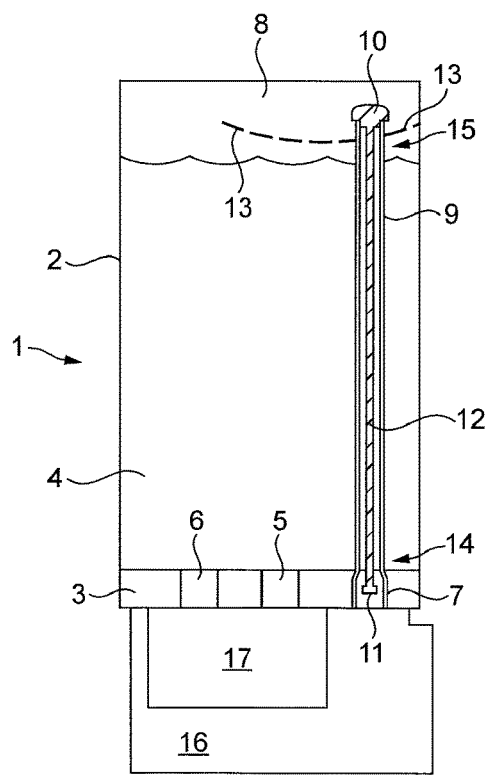

with the vehicle and to open to allow gas communication between the head space and the engine through the vent tube and vent port when the vent port is in fluid communication with the vehicle.

20 Claims, 1 Drawing Sheet

(51) Int. Cl.
*F01M 11/04* (2006.01)
*B65D 90/28* (2006.01)

(58) Field of Classification Search
USPC .................. 220/562, 203.04, 203.07, 203.2
See application file for complete search history.

(56) References Cited

U.S. PATENT DOCUMENTS

| | | | |
|---|---|---|---|
| 4,147,096 A * | 4/1979 | Caswell | F16K 24/04 137/513.5 |
| 4,151,823 A | 5/1979 | Grosse et al. | |
| 4,328,909 A * | 5/1982 | Jeans | B65D 83/00 222/481.5 |
| 4,978,027 A * | 12/1990 | Larson | B60K 15/03504 220/373 |
| 5,454,354 A | 10/1995 | Miller | |
| 5,640,936 A * | 6/1997 | Hudson | F01M 1/12 123/196 A |
| 6,048,454 A | 4/2000 | Jenkins | |
| 6,348,149 B1 | 2/2002 | Jenkins | |
| 6,793,818 B1 | 9/2004 | Entringer et al. | |
| 2002/0117233 A1 | 8/2002 | Kellogg | |
| 2005/0092769 A1* | 5/2005 | Macler, II | B67B 7/28 222/83 |
| 2007/0017918 A1* | 1/2007 | Kirk | A01D 34/82 220/563 |
| 2009/0211552 A1 | 8/2009 | Prior et al. | |
| 2010/0218522 A1* | 9/2010 | Cochran | F25B 31/004 62/115 |
| 2011/0253092 A1 | 10/2011 | Springer et al. | |
| 2015/0291317 A1 | 10/2015 | Brett et al. | |
| 2015/0291318 A1 | 10/2015 | Barnes et al. | |
| 2015/0292371 A1 | 10/2015 | Barnes et al. | |
| 2015/0292372 A1 | 10/2015 | Barnes et al. | |

FOREIGN PATENT DOCUMENTS

| | | |
|---|---|---|
| EP | 1240932 | 9/2002 |
| FR | 2004064 | 11/1969 |
| WO | WO 2007/101314 | 9/2007 |
| WO | WO 2016/158971 | 10/2016 |

* cited by examiner

REPLACEABLE FLUID CONTAINER

This application is the U.S. National Phase of international Application No. PCT/EP2013/074206 filed Nov. 19, 2013 which designated the U.S. and claims priority to European Patent Application No. 12193246.1 filed Nov. 19, 2012 and European Patent Application No. 13157229.9 filed Feb. 28, 2013, each of which is hereby incorporated by reference in its entirety.

This invention relates to replaceable fluid containers for vehicles and engines. The invention also relates to an apparatus comprising such a container in fluidic communication with a fluid system and to a vehicle comprising such an apparatus.

Many vehicle engines use one or more fluids for their operation. Such fluids are often liquids. For example, internal combustion engines use liquid lubricating oil compositions. Also, electric engines use heat exchange liquids for example to cool the engine, to heat the engine or to cool and heat the engine during different operating conditions. Such fluids are generally held in reservoirs associated with the engine and may require periodic replacement.

Conventional periodic replacement of engine lubricating oil composition in a vehicle engine usually involves draining the composition from the engine sump. The process may also involve removing and replacing the engine oil filter. Such a procedure usually requires access to the engine sump drain plug and oil filter from the underside of the engine, may require the use of hand tools and usually requires a suitable collection method for the drained lubricating oil composition.

Attempts have been made to provide a quick-change oil filter/reservoir system for an internal combustion.

U.S. Pat. No. 4,151,823 relates to a quick-change oil filter/reservoir system for an internal combustion engine having a primary oil pump and oil sump comprising a cartridge containing an oil filter element and supply of oil. In one embodiment shown in FIG. 1 of U.S. Pat. No. 4,151,823, and described at col. 3 lines 22 to 30, the cartridge is said to be retained on the mounting plate by conventional quick release mountings. The breather cap in this embodiment is shown with a pipe connected to the cap.

U.S. Pat. No. 6,348,149 relates to a manufacture for filtering oil.

U.S. Pat. No. 5,640,936 relates to a removable oil storage and supply tank for a dry sump four cycle internal combustion engine. According to one embodiment illustrated in FIG. 3 and described at col. 3 line 27 to col. 4 line 46 a tank 30 is supported at the bottom by the male portion 62 of three quick disconnect connectors 60. All three oil lines 54, 56 and 58 are said therein to be attached to the tank 30 by quick disconnect fluid connectors 60 which penetrate the bottom of the tank 30. According to the document at col. 4 lines 28 to 36, a tube 50 is attached to the top of the female member 64 of the connector 60 connected to the oil scavenger line 56. At col. 4 lines 37 to 41 it is stated that a tube 51 is attached to the top of the female member 64 of the connector 60 connected to the oil vent line 58. It is stated therein that this tube 51 extends the vent line 58 into the air space in the tank 30 above the oil level 52 so as to vent the same to the crankcase.

A vent for example in the form of a vent tube may be provided to a fluid reservoir of a container to facilitate removal of fluid out from the reservoir and/or to facilitate the flow of fluid into and out from the reservoir. It is sometimes also desirable to close the reservoir of the container to the external environment, for example when the container is to be transported, especially when it contains fluid for example liquid such as lubricating oil composition or heat exchanger fluid. One problem with a vent tube in such a container is that fluid may enter the vent tube even when the tube itself is closed to the external environment.

There remains a need for a replaceable fluid container for an engine which avoids or at least mitigates at least some of the problems with these containers.

Thus according to an aspect of the present invention there is provided a replaceable fluid container for a vehicle, the container comprising:

a housing comprising a fluid reservoir, at least one fluid port arranged on the housing to couple the reservoir in fluidic communication with a fluid system of the vehicle;

a vent port arranged on the housing to couple the reservoir in fluidic communication with the engine for allowing gas to be passed into and out from the reservoir;

a vent tube connected at a first end, to said vent port and arranged within the reservoir to pass through fluid contained in the reservoir when the container is connected with the fluid reservoir in fluidic communication with the fluid system, with a second end of the vent tube in a headspace above the fluid in the reservoir, to allow gas communication between the vent port and the headspace, in which the vent tube comprises a vent valve at the second end of the vent tube adapted to close to prevent ingress of fluid and gas from the reservoir into the vent tube when the vent port is not in fluidic communication with the vehicle and to open to allow gas communication between the head space and the engine through the vent tube and vent port when the vent port is in fluid communication with the vehicle.

According to a further aspect of the present invention there is provided an apparatus comprising a replaceable fluid container in fluidic communication with a fluid system of a vehicle, for example of a vehicle engine through the at least one fluid port and the vent port in which the container comprises:

a housing comprising a fluid reservoir;

at least one fluid port arranged on the housing to couple the reservoir in fluidic communication with a fluid system of the vehicle, for example of an engine on the vehicle;

a vent port arranged on the housing to couple the reservoir in fluidic communication with the vehicle for allowing gas to be passed into and out from the reservoir;

a vent tube connected at a first end, to said vent port and arranged within the reservoir to pass through fluid contained in the reservoir when the container is connected with the fluid reservoir in fluidic communication with the fluid system of the vehicle, with a second end of the vent tube in a headspace above the fluid in the reservoir, to allow gas communication between the vent port and the headspace, in which the vent tube comprises a vent valve at the second end of the vent tube adapted to close to prevent ingress of fluid and gas from the reservoir into the vent tube when the vent port is not in fluidic communication with the vehicle and to open to allow gas communication between the head space and the vehicle engine through the vent tube and vent port when the vent port is in fluid communication with the vehicle.

According to yet a further aspect of the present invention there is provided a vehicle comprising said apparatus.

These and other examples of the disclosure facilitate venting of a headspace in a fluid reservoir of a replaceable fluid container for a vehicle, for example for a vehicle engine when it is connected to a vehicle, and through use of a vent valve, provides a container which can avoid or at least reduce ingress of fluid into the vent tube when the container is disconnected from the vehicle. This may have an advantage that when a replaceable fluid container is fitted to a vehicle, for example to an engine on a vehicle, fluid is less likely to be present, if at all, in the vent tube. For example, if the vehicle comprises an engine which is an internal combustion engine and the reservoir of the replaceable container contains engine lubricating oil composition, inappropriate contamination of the engine with lubricant is reduced or even eliminated when the vent of the reservoir is connected in fluidic communication with the engine, for example with an air inlet port of the engine. The vent tube facilitates removal of fluid out from the reservoir and/or to facilitate the flow of fluid into and out from the reservoir. The vent valve facilitates closing the reservoir to the external environment, for example when the container is to be transported, especially when it contains fluid for example liquid such as lubricating oil composition or heat exchanger fluid.

In at least some examples the vent port comprises a vent port valve arranged to be closed when the vent port valve is not in fluidic communication with the vehicle, for example with an engine on a vehicle and to be open when the vent port is in fluidic communication with the vehicle thereby to allow gas communication between the headspace and engine through the vent tube and vent port. The vent port valve may be a poppet valve.

In at least some examples, the vent valve comprises an actuator rod arranged to be acted upon to open the vent valve when the vent port is in fluidic communication with the vehicle, for example with an engine on the vehicle.

In at least some examples, the vent valve comprises an actuator rod arranged to be acted upon to open the vent valve when the vent port is in fluidic communication with the engine; the vent port comprises a vent port valve arranged to be open when the vent port is in fluidic communication with the vehicle; and the actuator rod connects the vent port valve and the vent valve to allow simultaneous opening and closing of the vent valve and the vent port valve.

The actuator rod may be positioned within the vent tube.

In at least some examples, the vent valve comprises a poppet valve comprising a stem adapted to close the valve when the vent port is not in fluidic communication with the engine and to open the valve when the vent port is in fluidic communication with the vehicle, for example with an engine on a vehicle.

In at least some examples the vent valve comprises a poppet valve comprising a stem adapted to close the valve when the vent port is not in fluidic communication with the vehicle for example with an engine on a vehicle and to open the valve when the vent port is in fluidic communication with the vehicle; and the stem of the vent valve is connected to an actuator rod arranged to be acted upon to open the vent valve when the vent port is in fluidic communication with the vehicle, for example with an engine on a vehicle, and to close the valve when the vent port is not in fluidic communication with the vehicle.

In at least some examples, the vent valve comprises a poppet valve comprising a stem adapted to close the valve when the vent port is not in fluidic communication with the vehicle, for example with an engine on a vehicle and to open the valve when the vent port is in fluidic communication with the vehicle; the stem of the vent valve is connected to an actuator rod arranged to be acted upon to open the vent valve when the vent port is in fluidic communication with the engine and to close the valve when the vent port is not in fluidic communication with the vehicle, for example with an engine on a vehicle; and the actuator rod connects the vent port valve and the stem of the vent valve to allow simultaneous opening and closing of the vent valve and the vent port valve. The actuator rod may be positioned within the vent tube.

The poppet valve may comprises a plug which comprises a head which is arranged to extend beyond the periphery of the second end of the vent tube. These and other examples of the disclosure help reduce the possibility of fluid entering the vent tube when the vent valve is open, for example by the head acting as a partial shroud for the second end of the vent tube in the head space.

The second end of the vent tube may be adapted to inhibit ingress of fluid. For example, the second end of the vent tube may be angled or directed in a direction to inhibit ingress of fluid when the reservoir contains fluid, for example by being directed away from any point of in-flow of fluid to the reservoir through a fluid inlet port.

In at least some examples the reservoir comprises a perforate deflector adapted to inhibit fluid flow into the vent tube whilst allowing flow of gas into and out from the vent tube.

In at least some examples, the container comprises at least two fluid ports which include:
  at least one fluid outlet port arranged on the housing to couple the reservoir in fluidic communication with a fluid system of a vehicle, for example with a fluid system of an engine on a vehicle, for supplying fluid from the reservoir to the engine; and
  at least one fluid inlet port arranged on the housing to couple the reservoir in fluidic communication with the fluid system of the vehicle for receiving fluid from the vehicle to the reservoir.

The fluid ports, for example the fluid inlet port and the fluid outlet port may comprise self-sealing valves.

The at least one fluid port and the vent port may be arranged on a coupling mechanism.

In at least some examples the coupling mechanism is arranged such that the container is connectable to couple the reservoir in fluidic communication with the vehicle for example with an engine on the vehicle.

Each fluid port may comprise a self-sealing port. In general, self-sealing ports have the characteristic that when corresponding ports are being connected, a seal is made between the connecting ports before valve or valves open to allow fluid to flow. On disconnection, the valve or valves close to seal off each of the ports before the seal between the ports is broken. Suitable valves include spring loaded poppet valves and biased non-return valves.

Each self-sealing port of the container may provide a "dry break" in which no fluid flows on connection or disconnection of the ports. Alternatively, each self-sealing port of the system may provide a "damp break" in which there is flow of only a non-essential amount of fluid, for example a few drips of liquid, on disconnection or connection of the port.

In some examples, the inlet fluid port and the outlet fluid port may each or both comprise a non-return valve. Suitably, the vent port does not comprise a non-return valve.

In at least some examples the reservoir of the container contains a fluid, for example a liquid. The reservoir may be a reservoir for a fluid which is a liquid. The liquid may be lubricating oil composition, for example an engine lubricating oil composition or heat exchange fluid for an electric engine. The liquid may be a liquid for a self-sustaining fluid system for example a lubricating oil composition for example an engine lubricating oil composition, or a heat exchange fluid for example a heat exchange fluid for an electric engine. The liquid may be a liquid for a non-sustaining fluid system, for example de-icer, water and/or detergent.

Thus, the container may be provided as a self-contained system containing fresh, refreshed or unused engine lubricating oil composition which may conveniently replace a container on an engine which container comprises a reservoir containing used or spent engine lubricating oil composition. If the container also comprises a filter, this also is replaced together with the spent or used heat exchange fluid.

The lubricating oil composition may have heat exchange properties.

The lubricating oil composition may comprise at least one base stock and at least one lubricating oil additive. Suitable base stocks include bio-derived base stocks, mineral oil derived base stocks, synthetic base stocks and semi synthetic base stocks. Suitable lubricating oil additives, for example engine lubricating oil additives are known in the art. Examples of additives include organic and/or inorganic compounds. Typically, according to at least some examples, the engine lubricating oil composition comprises about 60 to 90% by weight in total of base stocks and about 40 to 10% by weight additives. Suitable engine lubricating oil compositions include lubricating oil compositions for internal combustion engines.

The lubricating oil composition may be a mono-viscosity grade or a multi-viscosity grade engine lubricating oil composition. Examples of suitable engine lubricating oil compositions include single purpose lubricating oil compositions and multi-purpose lubricating oil compositions.

According to at least some examples, the lubricating oil composition is a lubricating oil composition for example and engine lubricating oil composition for example for an internal combustion engine, for example a spark ignition internal combustion engine and/or a compression internal combustion engine.

The liquid may be a heat exchange fluid for an electric engine. Thus, the container may be provided as a self-contained system containing fresh, refreshed or unused heat exchange fluid for an electric engine which may conveniently replace a container on an engine which container comprises a reservoir containing used or spent heat exchange fluid. If the container also comprises a filter, this also is replaced together with the spent or used heat exchange fluid.

Suitable heat exchange fluids for electric engines include aqueous and non-aqueous fluids. Suitable heat exchange fluids for electric engines include those which comprise organic and/or non-organic performance boosting additives. Suitable heat exchange fluids include be man-made or bio-derived fluids, for example Betaine. According to at least some embodiments, the heat exchange fluids have fire retarding characteristics and/or hydraulic characteristics. Suitable heat exchange fluids include phase change fluids. Suitable heat exchange fluids include molten metals and salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

Whilst vehicle fluid systems for example vehicle engine fluid systems have been described herein, the present invention also relates to fluid systems for engines in general whether or not associated with a vehicle.

Thus, according to a further aspect of the present invention there is provided a replaceable fluid container for an engine, the container comprising:
 a housing comprising a fluid reservoir;
 at least one fluid port arranged on the housing to couple the reservoir in fluidic communication with a fluid system of the engine;
 a vent port arranged on the housing to couple the reservoir in fluidic communication with the engine for allowing gas to be passed into and out from the reservoir;
 a vent tube connected at a first end, to said vent port and arranged within the reservoir to pass through fluid contained in the reservoir when the container is connected with the fluid reservoir in fluidic communication with the fluid system of the engine, with a second end of the vent tube in a headspace above the fluid in the reservoir, to allow gas communication between the vent port and the headspace,
in which the vent tube comprises a vent valve at the second end of the vent tube adapted to close to prevent ingress of fluid and gas from the reservoir into the vent tube when the vent port is not in fluidic communication with the engine and to open to allow gas communication between the head space and the engine through the vent tube and vent port when the vent port is in fluid communication with the engine.

According to another aspect there is provided an apparatus comprising a container as hereindescribed in fluidic communication with the fluid system of a vehicle, for example with the fluid system of a vehicle engine through the inlet port and the outlet port, and with the vent port in fluidic communication with the vehicle, for example with an engine on the vehicle e.g. with the fluid system of a vehicle engine and/or with the an air inlet manifold of a vehicle engine when the engine is an internal combustion engine.

According to another aspect there is provided an apparatus comprising a container as hereindescribed in fluidic communication with the fluid system of an engine through the inlet port and the outlet port, and with the vent port in fluidic communication with the engine for example with the fluid system of the engine and/or with the an air inlet manifold of the engine when the engine is an internal combustion engine.

According to another aspect there is provided a vehicle comprising an apparatus as hereindescribed.

The engine may be an internal combustion engine. Suitable internal combustion engines include spark ignition internal combustion engines and compression ignition internal combustion engines. The engine may be an electric engine.

Suitable vehicles include motorcycles, earthmoving vehicles, mining vehicles, heavy duty vehicles and passenger cars.

The invention extends to methods and/or apparatus substantially as herein described with reference to the accompanying drawings.

Any feature in one aspect of the invention may be applied to other aspects of the invention, in any appropriate combination. In particular, features of method aspects may be applied to apparatus aspects, and vice versa.

Figure 2:
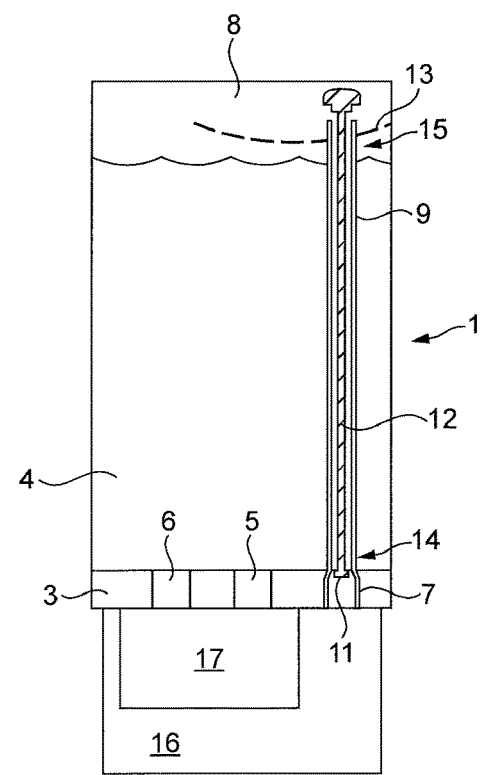

The invention will now be described by way of example only and with reference to the following drawings in which:

FIG. 1 is a side cross-sectional view of a container according to the present invention with a vent valve shown therein in a closed position; and FIG. 2 is a side cross-sectional view of the container of FIG. 1 with the vent valve in an open position.

In the drawings like reference numerals are used to indicate like elements.

Referring to FIGS. 1 and 2, container 1 comprises a reservoir 2 and a coupling mechanism 3. The coupling mechanism 3 is arranged to connect, in use, to an engine 16, for example an internal combustion engine. In use the reservoir 2 contains fluid 4 which can be supplied to the engine fluid system 17 via an outlet fluid port 5 and used fluid is returned to the reservoir 2 via fluid inlet port 6. So that the fluid 4 can be gravity fed through the outlet port 5 it is necessary to allow a gas, usually air, into the reservoir 2. This is done by providing a vent port 7 connected to a first end 14 of vent tube 9. The vent tube 9 passes through fluid 4 contained in the reservoir 2 with a second end 15 of the vent tube 9 in a headspace 8 above the fluid 4 in the reservoir 2, to allow gas communication between the vent port 7 and the headspace 8. The vent tube 9 comprises a vent valve 10 at the second end 15 of the vent tube 9 adapted to close to prevent ingress of fluid and gas from the reservoir 1 into the vent tube 9 when the vent port 7 is not in fluidic communication with the engine and to open to allow gas communication between the head space 8 and the engine through the vent tube 9 and vent port 7 when the vent port 7 is in fluid communication with the engine.

The venting tube 9 that passes through the fluid 4 when the container 1 is in an upright position and allows gas to pass unhindered through the fluid 4 in the reservoir 2 and to the headspace 8. The vent valve 10 comprises an actuator rod 11 arranged to be acted upon to open the vent valve 10 when the vent port 7 is in fluidic communication with the engine 16 for example the air inlet manifold of an internal combustion engine. The actuator rod is positioned within the vent tube 9.

As shown in FIG. 1, when the vent port 7 is not in fluidic communication with the engine 16 the vent valve 10 is closed and prevents ingress of fluid 4 and gas from the headspace 8 from the reservoir 2 into the vent tube 9.

The fluid inlet port 6 and the fluid outlet port 5 may comprise self-sealing valves (not shown). So, for transportation purposes, the reservoir 2 is sealed from the external environment and no fluid 4 can escape. A biasing mechanism (not shown), such as a spring, may be provided to ensure that the vent valve 10 remains closed when the container is being transported.

FIG. 2 shows the corresponding container 1 of FIG. 1 when in position on an engine 16 with the fluid ports 5, 6 in fluidic communication with the fluid system 17 of the engine and the vent port 7 in fluid communication with the engine 16, for example the air intake manifold of an internal combustion engine.

Engagement of the connecting mechanism 3 with the engine 17 brings the vent port 7 into fluidic communication with the engine 16 (for example with an air inlet manifold of the engine when the engine is an internal combustion engine) and the fluid ports 5, 6 into fluidic communication with the engine fluid system 17 and causes the activator rod 11 to act upon and open the vent valve 10.

This allows gas communication between the headspace 8 and the engine 16, for example the air inlet manifold of an internal combustion engine through the vent tube 9 and vent port 7.

As can be seen from both of FIGS. 1 and 2 a deflector plate 13 may be provided. This deflector plate 13 is perforate and is arranged to inhibit fluid 4 from splashing up and into the second end 15 of the vent tube 9, for example due to sudden movements of the engine for example if the engine is an engine of an vehicle which undergoes braking or other motion. Also, the vent valve 10 is a poppet valve comprising a plug which comprises a head which is arranged to extend beyond the periphery of the second end 15 of the vent tube 9. These and other examples of the disclosure have an advantage that that even when the vent valve is open any fluid 4 inadvertently landing on the head of the vent valve 10 will fall back and around the vent tube 9, rather than entering the vent tube 9.

With the present invention it is possible to provide a container for removal attachment to an engine which can supply fluid thereto and which can be vented during use yet sealed for transportation.

While aspects of the invention have been described in relation to vehicle engines and examples of the invention described the use of engine lubricating oil compositions, it is envisaged that features of the invention could find other applications.

For example, a fluid container according to an aspect of the invention could be used in relation to a wide range of apparatus or equipment. For example, the fluid container could find application in relation to various static and movable machines, for example industrial machines such as a lathe, or manufacture and assembly equipment, to an engine, or to a vehicle.

Examples of a fluid container of an aspect of the invention could thus be used to supply lubricant composition to a region of the apparatus or equipment, for example to a region including one or more moving parts, for example a gearbox. In an example of an aspect of the invention there is provided a fluid container for a wind turbine, for example to provide lubricating composition to one or more parts of the wind turbine apparatus.

The container may supply a lubricant composition to the apparatus, or may supply fluid other than lubricant to the apparatus. For example, the fluid may comprise a fuel composition, for example gasoline or diesel The reservoir of an aspect of the invention may be for supply of the fluid for example to the fuel supply system of the apparatus. For example, the reservoir may supply fuel to a vehicle, or tool, for example to a car, motorcycle or lawn mower.

In another example, the container is used to supply a fluid, for example lubricant and/or fuel, to a hand tool, for example a hedge trimmer or leaf blower.

The fluid may comprise for example an aqueous or other solvent-based composition, for example a cleaning composition. The fluid may for example comprise windscreen wash fluid. A container of an example of an aspect of the invention may be for supplying fluid to the windscreen washer fluid delivery system for example of a vehicle.

Thus in some examples of aspects of the invention the fluid system may or may not comprise a fluid circulation system.

A further aspect of the invention provides a replaceable fluid container for an apparatus, the container comprising:
  a housing comprising a fluid reservoir,
    at least one fluid port arranged on the housing to couple the reservoir in fluidic communication with a fluid system of the apparatus;
  a vent port arranged on the housing to couple the reservoir in fluidic communication with the apparatus for allowing gas to be passed into and out from the reservoir;
  a vent tube connected at a first end, to said vent port and arranged within the reservoir to pass through fluid contained in the reservoir when the container is connected with the fluid reservoir in fluidic communication with the fluid system, with a second end of the vent tube in a headspace above the fluid in the reservoir, to allow gas communication between the vent port and the headspace, in which the vent tube comprises a vent valve at the second end of the vent tube adapted to close to prevent ingress of fluid and gas from the reservoir into the vent tube when the vent port is not in fluidic communication with the apparatus and to open to allow gas communication between the head space and the apparatus through the vent tube and vent port when the vent port is in fluid communication with the apparatus.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A replaceable fluid container for a vehicle, the container comprising:
    a housing comprising a fluid reservoir;
    at least one fluid port arranged on the housing to couple the reservoir in fluidic communication with a fluid system of the vehicle;
    a vent port arranged on the housing to couple the reservoir in fluidic communication with an engine of the vehicle for allowing gas to be passed into and out from the reservoir;
    a vent tube connected at a first end, to said vent port and arranged within the reservoir to pass through fluid contained in the reservoir when the container is connected with the reservoir in fluidic communication with the fluid system, with a second end of the vent tube in a headspace above the fluid in the reservoir, to allow gas communication between the vent port and the headspace,
    in which the vent tube comprises a vent valve at the second end of the vent tube that closes in the headspace to prevent ingress of fluid and gas from the reservoir into the vent tube when the vent port is not in fluidic communication with the vehicle and that opens in the headspace to allow gas communication between the head space and the engine through the vent tube and vent port when the vent port is in fluid communication with the vehicle.

2. A container as claimed in claim 1 in which the vent port comprises a vent port valve that closes when the vent port valve is not in fluidic communication with the vehicle and that opens when the vent port is in fluidic communication with the vehicle thereby to allow gas communication between the headspace and vehicle through the vent tube and vent port.

3. A container as claimed in claim 2 in which the vent port valve is a poppet valve.

4. A container as claimed in claim 1 in which the vent valve comprises an actuator rod arranged to be acted upon to open the vent valve when the vent port is in fluidic communication with the vehicle.

5. A container as claimed in claim 4 in which the vent port comprises a vent port valve that opens when the vent port is in fluidic communication with the vehicle and in which the actuator rod connects the vent port valve and the vent valve to allow opening and closing of the vent valve and the vent port valve.

6. A container as claimed in claim 5 in which the opening of the vent valve and the vent port valve is simultaneous.

7. A container as claimed in claim 5 in which the closing of the vent valve and the vent port valve is simultaneous.

8. A container as claimed in claim 4 in which the actuator rod is positioned within the vent tube.

9. A container as claimed in claim 1 in which the vent valve comprises a poppet valve comprising a stem that closes the valve when the vent port is not in fluidic communication with the vehicle and that opens the valve when the vent port is in fluidic communication with the vehicle.

10. A container as claimed in claim 9 in which the vent poppet valve comprises a plug which comprises a head which extends beyond the periphery of the second end of the vent tube.

11. A container as claimed in claim 9 in which the stem of the vent valve is connected to an actuator rod arranged to be acted upon to open the vent valve when the vent port is in fluidic communication with the vehicle and to close the vent valve when the vent port is not in fluidic communication with the vehicle.

12. A container as claimed in claim 11 in which the vent port comprises a vent port valve that opens when the vent port is in fluidic communication with the vehicle and that closes when the vent port is not in fluidic communication with the vehicle and in which the actuator rod connects the vent port valve and the stem of the vent valve to allow simultaneous opening and closing of the vent valve and the vent port valve.

13. A container as claimed in claim 1 in which the second end of the vent tube inhibits ingress of fluid.

14. A container as claimed in claim 1 in which the container comprises at least two fluid ports which include:
    at least one fluid outlet port arranged on the housing to couple the reservoir in fluidic communication with a fluid system of the vehicle for supplying fluid from the reservoir to the vehicle; and
    at least one fluid inlet port arranged on the housing to couple the reservoir in fluidic communication with the fluid system of the vehicle for receiving fluid from the vehicle to the reservoir.

15. A container as claimed in claim 1 in which the reservoir comprises a perforate deflector that inhibits fluid flow into the vent tube whilst allowing flow of gas into and out from the vent tube.

16. A container as claimed in claim 15 in which the perforate deflector is positioned between the first end and second end of the vent tube.

17. A container as claimed in claim 1 in which the reservoir contains a fluid.

18. A container as claimed in claim 17 in which the fluid is an engine lubricating oil composition or a heat exchange fluid for an electric engine.

19. An apparatus comprising a container as claimed in claim 1 in fluidic communication with a fluid system of a vehicle engine through the at least one fluid port and with the vent port in fluidic communication with the vehicle engine.

20. A replaceable fluid container for an apparatus, the container comprising:
    a housing comprising a fluid reservoir;
    at least one fluid port arranged on the housing to couple the reservoir in fluidic communication with a fluid system of the apparatus;
    a vent port arranged on the housing to couple the reservoir in fluidic communication with the apparatus for allowing gas to be passed into and out from the reservoir;
    a vent tube connected at a first end, to said vent port and arranged within the reservoir to pass through fluid contained in the reservoir when the container is connected with the reservoir in fluidic communication with the fluid system, with a second end of the vent tube in a headspace above the fluid in the reservoir, to allow gas communication between the vent port and the headspace, in which the vent tube comprises a vent valve at the second end of the vent tube that closes in the headspace to prevent ingress of fluid and gas from the reservoir into the vent tube when the vent port is not in fluidic communication with the apparatus and that opens in the headspace to allow gas communication between the head space and the apparatus through the vent tube and vent port when the vent port is in fluid communication with the apparatus.

\* \* \* \* \*